(12) United States Patent
Hornung et al.

(10) Patent No.: US 10,005,044 B2
(45) Date of Patent: Jun. 26, 2018

(54) VIRUS FILTER

(71) Applicant: Gambro Lundia AB, Lund (SE)

(72) Inventors: Markus Hornung, Nehren (DE);
Bernd Krause, Rangendingen (DE);
Johannes Geckeler, Hechingen (DE);
Ferdinand Schweiger, Rangendingen
(DE); Szymon Dutczak, Hechingen
(DE); Simon Beiter, Hechingen (DE)

(73) Assignee: GAMBRO LUNDIA AB, Lund (SE)

( * ) Notice: Subject to any disclaimer, the term of this patent is extended or adjusted under 35 U.S.C. 154(b) by 328 days.

(21) Appl. No.: 14/766,844

(22) PCT Filed: Feb. 24, 2014

(86) PCT No.: PCT/EP2014/053492
§ 371 (c)(1),
(2) Date: Aug. 10, 2015

(87) PCT Pub. No.: WO2014/128286
PCT Pub. Date: Aug. 28, 2014

(65) Prior Publication Data
US 2015/0367291 A1    Dec. 24, 2015

(30) Foreign Application Priority Data

Feb. 25, 2013 (EP) .................................... 13156602

(51) Int. Cl.
B01D 61/14 (2006.01)
B01D 65/02 (2006.01)
(Continued)

(52) U.S. Cl.
CPC .............. B01D 71/42 (2013.01); B01D 61/14 (2013.01); B01D 65/022 (2013.01); B01D 67/009 (2013.01); B01D 69/02 (2013.01); B01D 69/08 (2013.01); B01D 69/081 (2013.01); B01D 69/085 (2013.01); B01D 69/087 (2013.01); B01D 69/088 (2013.01); B01D 71/44 (2013.01); B01D 2321/34 (2013.01);
(Continued)

(58) Field of Classification Search
None
See application file for complete search history.

(56) References Cited

U.S. PATENT DOCUMENTS

2011/0259816 A1 * 10/2011 Yokota ................. B01D 69/087
210/500.23

FOREIGN PATENT DOCUMENTS

EP    0 923 984         6/1999
EP    2545985 A1 *     1/2013  ......... B01D 67/0088
(Continued)

OTHER PUBLICATIONS

BASF PVP information—"Luvitec K and VA-grades for Adhesive Applications"—BASF—Dec. 2008.*
(Continued)

Primary Examiner — Krishnan S Menon
Assistant Examiner — Bradley R Spies
(74) Attorney, Agent, or Firm — K&L Gates LLP

(57) ABSTRACT

The invention relates to a virus filter membrane which can be used for the removal of virus particles including parvovirus. The invention further relates to a method for producing the membrane. The membrane comprises polyacrylonitrile and polyvinylpyrrolidone.

16 Claims, 2 Drawing Sheets

(51) Int. Cl.
*B01D 67/00* (2006.01)
*B01D 69/02* (2006.01)
*B01D 69/08* (2006.01)
*B01D 71/42* (2006.01)
*B01D 71/44* (2006.01)
*C02F 101/00* (2006.01)

(52) U.S. Cl.
CPC .. *B01D 2323/345* (2013.01); *B01D 2325/026* (2013.01); *B01D 2325/04* (2013.01); *C02F 2101/00* (2013.01)

(56) References Cited

FOREIGN PATENT DOCUMENTS

| | | |
|---|---|---|
| JP | H10 337456 | 12/1998 |
| KR | 100 415 342 | 1/2004 |

OTHER PUBLICATIONS

International Search Report for International Application No. PCT/EP2014/053492, dated Jun. 4, 2014.
Qin et al., "Hollow fiber ultrafiltration membranes made from blends of PAN and PVP," Separation and Purification Technology, vol. 36, No. 2, Apr. 1, 2004, pp. 149-155.

\* cited by examiner

VIRUS FILTER

PRIORITY CLAIM

This application is a 371 National Stage Application of International Application No. PCT/EP2014/053492, filed Feb. 24, 2014, which claims priority to and the benefit of European Application No. 13156602.8, filed Feb. 25, 2013, the disclosures of each of which are incorporated by reference herein in their entireties.

TECHNICAL FIELD

The invention relates to a virus filter membrane which can be used for the removal of virus particles including parvovirus. The invention further relates to a method for producing the membrane. The membrane comprises polyacrylonitrile and polyvinylpyrrolidone.

BACKGROUND OF THE INVENTION

JP 10337456 A discloses a polyacrylonitrile-based precision filter membrane having a pore size in the range of from 0.01 to 1 µm. The membrane is produced from a solution comprising 2-50 wt % (preferably 5-35 wt %, more preferably 10-25 wt %) of an acrylonitrile homo- or copolymer of at least 70 wt % acrylonitrile with ≤30 wt. % of one or more vinyl compounds copolymerizable with acrylonitrile in a mixed solvent comprising two or more organic solvents and 1-40 wt % (preferably 1-30 wt %) polyvinylpyrrolidone having a weight average molecular weight in the range of from 1,000 Da to 1,300,000 Da (preferably 2,900 Da to 110,000 Da). The mixed solvent comprises γ-butyrolactone or ethylene carbonate. Hollow fiber membranes are produced by spinning the solution into a coagulation bath having a temperature of from −30° C. to 90° C. (preferably 0° C.-90° C., more preferably 0° C.-80° C.).

Working Example 1 of JP 10337456 A describes the production of a hollow fiber membrane from a spinning solution comprising 16 wt % of a copolymer of 91.5 wt % acrylonitrile, 8.0 wt % methyl acrylate and 0.5 wt % sodium methallyl sulfonate; and 20 wt % PVP having a weight average molecular weight of 9,000 Da (BASF K17); in 48 wt % N-methyl-2-pyrrolidone (NMP) and 16 wt % γ-butyrolactone. The solution is spun at 80° C. through a double-orifice spinneret (0.5 mm-0.7 mm-1.3 mm) into a coagulation bath comprising water at 80° C., using a center fluid consisting of 90 wt % NMP and 10 wt % water. The air gap between nozzle and coagulation bath is 20 mm, the atmosphere in the spinning shaft surrounding the nozzle has a temperature of 60° C. and 100% humidity. Spinning velocity is 10 m/min. Average pore size of the membrane obtained is 0.12 µm. In Comparative Example 1, the procedure is repeated using only NMP as solvent, yielding a hollow fiber membrane having an average pore size of 0.0089 µm.

EP 0 923 984 A1 discloses a polyacrylonitrile-based hollow fiber membrane having a sponge structure. Pore sizes of the membrane continuously decrease from the center of the membrane wall towards both surfaces of the membrane, and the pore size on the outer surface of the membrane is different from that on the inner surface. The membrane is produced from a solution comprising 5 to 35 wt % of an acrylonitrile-based polymer, a solvent mixture of 2 to 99.9 wt % propylene carbonate and at least one other organic solvent capable of dissolving the acrylonitrile-based polymer, and 1 to 40 wt % of a specific additive selected from water, salts, alcohols, ketones, glycols, glycerol, and polyvinylpyrrolidone having a weight average molecular weight of from 1 to 2,800 kDa.

Working Example 1 of EP 0 923 984 A1 details the production of a hollow fiber membrane from a solution of 18.5 wt % of a copolymer of 91.5 wt % acrylonitrile, 8.0 wt % methyl acrylate and 0.5 wt % sodium methallyl sulfonate; and 21 wt % poly-ethylene glycol having a weight average molecular weight of 600 Da (PEG 600); in a mixture of 9.15 wt % propylene carbonate and 51.85 wt % of dimethyl sulfoxide. The membrane had an inner diameter of 760 µm and an outer diameter of 1340 µm, an average pore size on the outer surface of 0.02 µm and an average pore size on the inner surface of 0.08 µm. Its water permeability was $96 \cdot 10^{-4}$ cm$^3$/(cm$^2$·bar·sec).

KR 415342 B1 discloses a method for manufacturing a polyacrylonitrile porous hollow fiber membrane which is used as an ultrafiltration membrane. The process uses a polymer solution comprising 12-25 wt % polyacrylonitrile; 3-15 wt % of a first additive comprising polyvinylpyrrolidone, polyvinyl alcohol or a mixture thereof; 10-40 wt % 1-butoxyethanol as second additive; and a solvent selected from the group consisting of N-methylpyrrolidone, N,N-dimethylformamide, N,N-dimethylacetamide and mixtures thereof. The examples use DMF solutions comprising 18-22 wt % polyacrylonitrile having a weight average molecular weight of 150 kDa; and 5% PVP having a weight average molecular weight of 10 kDa. The membranes obtained comprise 5 or 7 different zones, two of them having a finger structure with macrovoids.

KR 20010106681 A discloses a method for preparing a polyacrylonitrile porous flat sheet membrane having a sponge structure without macrovoids. The process uses a polymer solution comprising 10 wt % polyacrylonitrile and 5 wt % polyvinylpyrrolidone in dimethylsulfoxide. The solutions are spread onto a glass plate and dipped into a coagulation bath comprising 70 wt % dimethylsulfoxide, 20 wt % water and 10 wt % polyvinylpyrrolidone. Different polyvinylpyrrolidones with weight average molecular weights of 10 kDa, 55 kDa, and 1,300 kDa, respectively, are used in the examples. Membranes showing a sponge structure without macrovoids were only obtained with polyvinylpyrrolidone having a weight average molecular weight of 10 kDa.

SUMMARY OF THE INVENTION

The present invention provides a hollow fiber membrane showing a homogeneous sponge structure and comprised of polyacrylonitrile (PAN) and polyvinylpyrrolidone (PVP) having a weight average molecular weight of more than 1,000 kDa, which can be used for virus removal from liquids. The membrane is prepared from a solution of 8-12 wt % polyacrylonitrile and 2 to less than 6 wt % polyvinylpyrrolidone in N-methyl-2-pyrrolidone (NMP). The membrane shows (i) high rejection for gold nano-particles (having 20 nm diameter and simulating parvovirus), (ii) high passage of Mab feed solution (sieving coefficient for IgG 1), (iii) high feed flux (which results in a high feed capacity for this type of membrane), and (iv) low protein adsorption and low fouling, which ensures a stable high filtration rate over time.

DETAILED DESCRIPTION OF THE INVENTION

Figure 1:
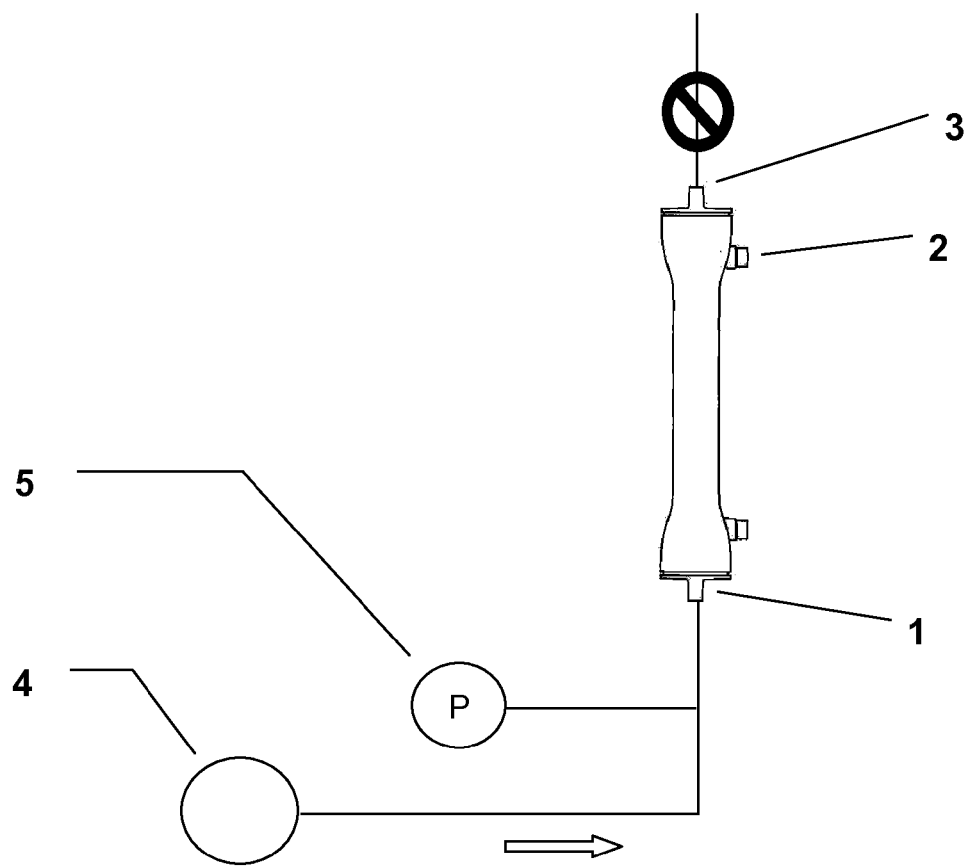
FIG. 1 is a schematic illustration of the set-up for a burst pressure test.

In one aspect of the present invention, a hollow fiber membrane comprising polyacrylonitrile and polyvinylpyrrolidone, having a hydraulic permeability of from $8 \cdot 10^{-4}$ to $15 \cdot 10^{-4}$ cm$^3$/(cm$^2 \cdot$bar$\cdot$sec), preferably from $9 \cdot 10^{-4}$ to $11 \cdot 10^{-4}$ cm$^3$/(cm$^2 \cdot$bar$\cdot$sec), a sieving coefficient for IgG of greater than 0.9 and a GPR of greater than 1.7, preferably greater than 2.0, more preferably greater than 2.3, most preferably greater than 2.6 is provided.

The membrane used in the invention is prepared from a solution comprising polyacrylonitrile and polyvinylpyrrolidone.

Examples of suitable polyacrylonitrile homopolymers have a weight average molecular weight of about 150,000 to 250,000 Da, preferably 180,000 to 220,000 Da (CAS-Nr. 25014-41-9). An example of a suitable polyacrylonitrile for preparing the membranes of the invention is available from Dolan GmbH, D-93309 Kelheim (Donau) under the tradename HOMO-PAN.

The concentration of polyacrylonitrile in the solution generally is in the range of from 8 to 12 wt.-%, for instance, 9 to 11 wt.-%.

Examples of suitable polyvinylpyrrolidone homopolymers have a weight average molecular weight of about 1,000 to 2,000 kDa, e.g., 1,100 to 1,400 kDa, or 1,400 to 1,800 kDa; a number average molecular weight of about 200 to 400 kDa, e.g., 250 to 325 kDa, or 325 to 325 kDa; and a polydispersity $M_w/M_n$ of about 4 to 5, for instance, 4.3 to 4.4, or 4.3 to 4.8.

Examples of suitable polyvinylpyrrolidones for preparing the membranes of the invention are Luvitec® K85, Luvitec® K90, and Luvitec® K90HM, respectively, all available from BASF SE.

One embodiment of the invention uses a polyvinylpyrrolidone homopolymer having a weight average molecular weight of about 1,100 kDa; and a number average molecular weight of about 250 kDa.

Another embodiment of the invention uses a polyvinylpyrrolidone homopolymer having a weight average molecular weight of about 1,400 kDa; and a number average molecular weight of about 325 kDa.

Still another embodiment of the invention uses a polyvinylpyrrolidone homopolymer having a weight average molecular weight of about 1,800 kDa; and a number average molecular weight of about 375 kDa.

The concentration of polyvinylpyrrolidone in the solution generally is in the range of from 2 to 6 wt %, e.g., from 2 to less than 6 wt %, for instance, from 3 to 5 wt %.

In one embodiment, the spinning solution for preparing a membrane according to the present invention comprises from to 12 wt %, e.g., 9 to 11 wt %, relative to the total weight of the solution, of polyacrylonitrile, from 2 to less than 6 wt %, e.g. 3 to 5 wt %, relative to the total weight of the solution, of a high molecular weight 1,000 kDa) PVP, and from 82 to 90 wt %, e.g., 84 to 88 wt %, relative to the total weight of the solution, of NMP.

The viscosity of the polymer solution, measured according to DIN EN ISO 1628-1 at 22° C., usually is in the range of from 50,000 to 140,000 mPa$\cdot$s; for instance, from 50,000 to 120,000 mPa$\cdot$s; e.g., from 70,000 to 100,000 mPa$\cdot$s.

The porous hollow fiber membrane of the present invention can be prepared by a continuous solvent phase inversion spinning process, comprising the steps of a) dissolving at least one polyacrylonitrile (PAN), and at least one polyvinylpyrrolidone (PVP) in N-methyl-2-pyrrolidone to form a polymer solution;

b) extruding the polymer solution through an outer ring slit of a nozzle with two concentric openings into a precipitation bath; simultaneously c) extruding a center fluid through the inner opening of the nozzle;

d) washing the membrane obtained; and subsequently e) drying the membrane.

The center fluid or bore liquid which is used for preparing the membrane according to the invention comprises 20 to 40 wt % of water and 60 to 80 wt % of NMP, e.g., 25 to 40 wt % of water and 60 to 75 wt % of NMP.

The precipitation bath consists of NMP in an amount of from 60 wt % to 80 wt % and H$_2$O in amount of from 20 wt % to 40 wt %, e.g., 70 wt % to 80 wt % NMP and 20 wt % to 30 wt % H$_2$O. The precipitation bath has a temperature of from 5 to 30° C., e.g., 15 to 25° C.

In one embodiment of the process for preparing the membrane, the temperature of the spinneret is 25-50° C., e.g., 30-40° C. The distance between the opening of the nozzle and the precipitation bath is 0 to 5 cm, e.g., 0.5 to 2 cm. In another embodiment of the process, the nozzle is immersed in the precipitation bath. In one embodiment, the spinning speed is in the range of 5 to 10 m/min.

The membrane then is washed to remove residual solvent and low molecular weight components. In a particular embodiment of a continuous process for producing the membrane, the membrane is guided through several water baths. In certain embodiments of the process, the individual water baths have different temperatures. For instance, each water bath may have a higher temperature than the preceding water bath.

The membrane then is dried and subsequently may be sterilized. In one embodiment, the hollow fiber membrane subsequently is sterilized with beta-radiation at 25 to 50 kGy. In another embodiment, the hollow fiber membrane subsequently is sterilized with gamma-radiation. In still another embodiment, the hollow fiber membrane subsequently is sterilized with ethylene oxide (ETO).

The selectively permeable hollow fibers are of the symmetrical type and have a homogeneous sponge-like structure, which is substantially uniform throughout their thickness. The membrane does not allow the passage of virus particles having a diameter of 20 nm or more while it is permeable to antibodies like IgG. The hollow fibers are generally free of macrovoids (empty spaces included in the wall and having a largest dimension of more than about 5 microns). They do not possess a skin or a dense layer on the surface, either on the inside or on the outside.

In one embodiment, the membrane comprises 75-85 wt % of polyacrylonitrile (PAN) and 15-25 wt % of polyvinylpyrrolidone (PVP), relative to the total weight of the membrane. The proportion of PAN and PVP, respectively, in the membrane can be determined by elementary analysis.

In a specific embodiment of the present invention, the membrane is a hollow fiber membrane having an inner diameter of from 200 to 1,000 μm, preferably from 300 to 500 μm, and more preferably from 300 to 400 μm. The wall thickness is generally from 20 to 200 μm, preferably from 30 to 100 μm, and more preferably from 40 to 85 μm.

The fibers show a burst pressure, determined as described in the methods section below, of at least 5 bar(g), e.g., from 5 to 10 bar(g), for instance, from 7 to 9 bar(g).

The hydraulic permeability Lp of the membranes of the invention, measured at 37° C., may vary from $8 \cdot 10^{-4}$ to $15 \cdot 10^{-4}$ cm$^3$/(cm$^2 \cdot$bar$\cdot$sec), for instance, from $9 \cdot 10^{-4}$ to $11 \cdot 10^{-4}$ cm$^3$/(cm$^2 \cdot$bar$\cdot$sec). In one embodiment of the invention, the membranes are sterilized with beta radiation (or electron beam) at 25-50 kGy and subsequently show a hydraulic permeability Lp in the range of from $20 \cdot 10^{-4}$ to $40 \cdot 10^{-4}$ cm$^3$/(cm$^2 \cdot$bar$\cdot$sec), for instance, from $25 \cdot 10^{-4}$ to $35 \cdot 10^{-4}$ cm$^3$/(cm$^2 \cdot$bar$\cdot$sec).

The membranes of the invention have a sieving coefficient for IgG in aqueous solution, determined by dead-end filtration of a solution of 15.0 g/l IgG in PBS buffer at 25° C., of at least 0.9, e.g. at least 0.95, and in particular at least 0.99.

The membranes of the invention show a retention of gold nano-particles having 20 nm diameter (simulating porcine parvovirus), GPR (gold particle retention, defined as log(A/F), A/F being the ratio of the gold particle concentration in the feed and in the filtrate), measured at 25° C., of >1.7, preferably >2.0, more preferably >2.3, in particular >2.6. The GPR is proportional to the rate of retention of virus particles by the membrane. A GPR of 1.4 corresponds to a reduction of the number of porcine parvovirus in aqueous solution by 3 orders of magnitude, while a GPR of 2.3 corresponds to a reduction by 6 orders of magnitude. The membrane of the present invention can thus be advantageously used for the removal of virus particles from liquids.

Thus, a further aspect of the present invention is a diffusion and/or filtration device comprising a membrane of the invention, for instance, a device for removing virus particles from liquids.

The membrane used in the device can take the form of a hollow fiber or a plurality of hollow fibers, e.g. a bundle of hollow fiber membranes. Suitable fibers, their properties and preparation have been described above.

In one embodiment of the device, the membrane forms an interface between two fluid compartments of the device.

An exemplary device comprises two compartments separated by a semipermeable membrane mounted in a casing, a first internal compartment fitted with two accesses and a second external compartment comprising one or two accesses, both compartments being also separated by a potting compound, based on an appropriate adhesive compound, intended for forming as applicable (i) a cylindrical partition separating both compartments of said device containing a semipermeable membrane of the hollow fiber bundle type as defined above or (ii) a tight seal in said device including a semipermeable membrane of the sheet membrane type as defined above.

Another exemplary device comprises a plurality of hollow fiber membranes, contained within an outer shell, and configured so that fluid within a space external to the hollow fibers (i.e., an extracapillary compartment) is segregated from fluid passing through the hollow fibers and their corresponding orifices. Additionally, the device includes two manifold end chambers within the outer shell on opposite ends of the device. Each of the two lumina of a hollow fiber connects to a different end chamber. The end chambers and the extracapillary compartment are separated by the semipermeable membranes of the hollow fibers.

A further aspect of the invention is a method of removing virus particles from a liquid, comprising filtration of the liquid through a membrane of the invention. In one embodiment of the invention, the filtration is normal-flow filtration (NFF), which is also called dead-end or direct flow filtration.

In another embodiment of the invention, the filtration is tangential-flow filtration (TFF), which is also called cross-flow filtration. As the membrane of the invention does not have a skin, it is possible to perform both inside-out and outside-in filtration with it.

The membrane, the method, and the device of the invention can advantageously be used in many processes in the bio-pharmaceutical industry which require removal of virus particles from a liquid.

EXAMPLES

Methods
Preparation of Mini-Modules

Mini-modules [=fiber bundles in a housing] are prepared by cutting the fiber bundle to a length of 20 cm, drying the fibers for 1 h at 40° C. and <100 mbar and subsequently transferring the fiber bundle into the housing. The ends of the fibers are closed using a UV-curable adhesive. The mini-module is dried in a vacuum drying oven at 60° C. over night, and then the ends of the fiber bundle are potted with polyurethane. After the polyurethane has hardened, the ends of the potted membrane bundle are cut to reopen the fibers. The mini-modules ensure protection of the fibers.

The number of fibers required is calculated for an effective surface A of 10 cm$^2$ according to equation (1)

$$A = \pi \times d_i \times l \times n \ [cm^2] \qquad (1)$$

with
d$_i$=inner diameter of fiber [cm]
n=amount of fibers
l=effective fiber length [cm]

Hydraulic Permeability (Lp) of Mini-Modules

The hydraulic permeability of a mini-module is determined by pressing a defined volume of water under pressure through the mini-module, which has been sealed on one side, and measuring the required time. The hydraulic permeability can be calculated from the determined time t, the effective membrane surface area A, the applied pressure p and the volume of water pressed through the membrane V, according to equation (2):

$$Lp = V/[p \cdot A \cdot t] \qquad (2)$$

The effective membrane surface area A is calculated from the number of fibers, the fiber length, and the inner diameter of the fiber according to equation (3)

$$A = \pi \cdot d_i \cdot l \cdot n \ [cm^2] \qquad (3)$$

with
d$_i$=inner diameter of fiber [cm]
n=number of fibers
l=effective fiber length [cm]

The mini-module has to be wetted thirty minutes before the Lp-test is performed. For this purpose, the mini-module is put in a box containing 500 ml of ultrapure water. After 30 minutes, the mini-module is transferred into the testing system. The testing system consists of a water bath that is maintained at 37° C. and a device where the mini-module can be mounted. The filling height of the water bath has to ensure that the mini-module is located underneath the water surface in the designated device.

In order to avoid that a leakage of the membrane leads to a wrong test result, an integrity test of the mini-module and the test system has to be carried out in advance. The integrity test is performed by pressing air through the mini-module that is closed on one side of the bundle. Air bubbles indicate a leakage of the mini-module or the test device. It has to be checked if the leakage is due to an incorrect mounting of the mini-module in the test device or if a real membrane leakage is present. The mini-module has to be discarded if a leakage of the membrane is detected. The pressure applied in the integrity test has to be at least the same value as the pressure applied during the determination of the hydraulic permeability in order to ensure that no leakage can occur during the measurement of the hydraulic permeability because the pressure applied is too high.

Sieving Coefficient of IgG in Aqueous Solution

The sieving coefficient of IgG is determined by dead-end filtration of a solution of 15.0 g/l IgG in PBS buffer at 25° C.

The module containing 10 cm² hollow fiber membranes is first washed with PBS buffer (10 min at a flow rate of 0.7 ml/min).

Next, the PBS buffer is replaced with IgG solution (15 g/l) and the filtration is run for 150 min at a flow rate through the module of 0.7 ml/min IgG solution.

Every 15 minutes, the pressure and the flow rate of filtrate are recorded and a filtrate sample is taken. The IgG concentration is determined and the sieving coefficients are calculated.

Gold Particle Retention (GPR)

Preparation of Gold Particle Solution:

Approximately 10 ml are needed to perform the gold particle retention test of the 10 cm² Filter.

123 mg polyoxyethylene-β-naphtylether [CAS 35545-57-4](Solsperse® 27000, Lubrizol, Ltd., Hexagon Tower, Blackley, Manchester M9 8ZS, United Kingdom) and 20 mg Poly(sodium-4-styrenesulfonate), weight average MW 70,000 Da, [CAS 25704-18-1] are weighed into a flask and then 10 ml gold colloid containing 20 nm gold particles (EM.GC20, BB International, Golden Gate, 73 Ty Glas Avenue, Cardiff, CF14 5DX U.K.) is added. All the components are stirred for 15 min at 25° C. in a closed flask.

GPR Test:

The test is performed at a temperature of 25° C.

The module containing 10 cm² hollow fiber membranes first is washed with PBS buffer (10 min at a flow rate of 0.7 ml/min).

Next, the PBS buffer is replaced with the gold solution. After removing from the filter all the residual PBS solution, the filtration is started at a flow rate of 0.35 ml/min, and filtrate samples are collected.

Once the filtrate sample reaches a volume of about 1 ml, the collecting vessel is changed and gathering of the new fraction begins. The procedure is repeated until a total of four fractions (labeled I to IV) have been collected.

The particle content in the feed, the filtrate, and the retentate is determined photometrically by measuring extinction at 530 nm, e.g., using an Ultrospec™ 3000 pro photometer.

The GPR value is calculated according to equation (4)

$$GPR = \log_{10}\left(\frac{A}{F}\right) \quad (4)$$

with

A being the extinction of the feed solution; and

F being the extinction of the filtrate.

Burst pressure

Before testing the burst pressure, an integrity test followed by measurement of the hydraulic permeability (Lp) is performed on the mini-module as described above.

The set-up for the burst pressure test is shown in FIG. 1.

The feed (1) and the filtrate sides (2) are purged using compressed air having 0.5 bar gauge pressure.

The tubing is glued to the mini module's feed (1) and retentate (3) connectors using cyclohexanone and a UV-curing adhesive.

The mini-module then is connected to the pressure regulator (4) and the retentate connector (3) is closed. The pressure sensor equipped with a data logger (5) is connected. The filtrate connectors (2) stay open.

The measurement is started (logging interval 3 sec.).

Using pressure regulator (4), the test pressure is set to 2 bar(g) and kept for 1 minute.

Subsequently, the pressure is increased by 1 bar every minute until the fibers burst. The burst is audible and at the same time a slight pressure decrease is observed.

The test is passed if the fibers withstand 7 bar(g) without bursting.

At the end of the test, the data from the data logger is read out and the burst pressure is determined.

Viscosity of the Polymer Solution

The viscosity of the polymer solution was measured according to DIN EN ISO 1628-1 at 22° C.

Example 1

Preparation of a Hollow Fiber Membrane

A solution of 10% w/w polyacrylonitrile having a weight average molecular weight of about 200 kDa (HOMO-PAN, Dolan GmbH, D-93309 Kelheim (Donau)) and 4% w/w PVP having a weight average molecular weight of about 1,100 kDa (Luvitec® K85, BASF SE) in NMP having a viscosity of 90,400 mPa·s was thermostatted at 31° C. and extruded through the outer ring slit of a spinneret with two concentric openings into a coagulation bath containing water/NMP in a ratio of 30%/70% w/w. A solution containing 25% w/w water and 75% w/w NMP was used as the center fluid and extruded through the inner opening of the spinneret. The temperature of the spinneret was 31° C., the temperature of the coagulation bath was 21° C. and the air gap 1.5 cm. The fibers were spun at a speed of 6 m/min. The fiber obtained had an inner diameter of 340 µm and a wall thickness of 40 µm in a wet state.

Figure 2:
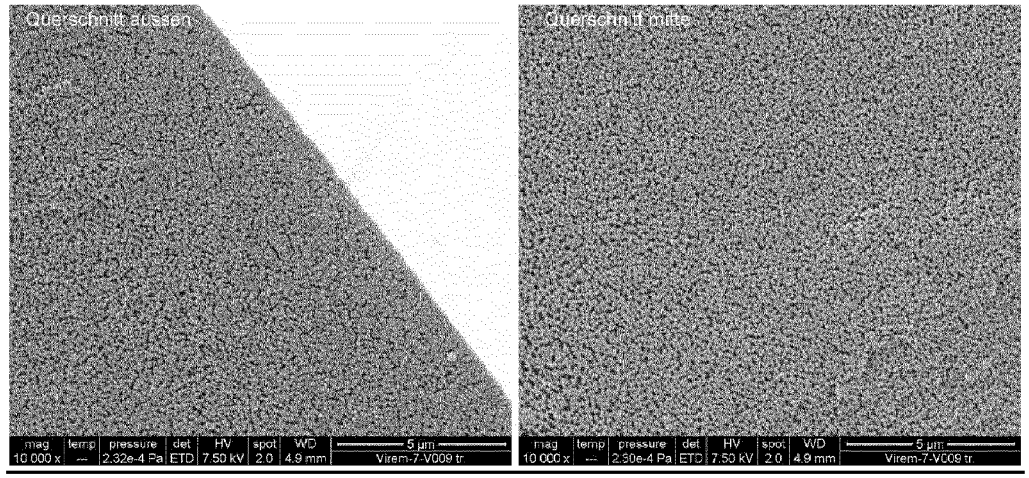
FIG. 2 shows SEM pictures of a cross-section of one embodiment of a membrane near the outer surface and in the center of the membrane wall.

The fibers subsequently were washed with demineralized water for 1 h at 80° C. Water was drained from the fibers by centrifugation, and the fibers subsequently were dried overnight at 50° C. under a constant flow of dry air. SEM pictures of a cross-section of the membrane near the outer surface and in the center of the membrane wall are shown in FIG. 2.

Mini-modules comprising 7 fibers (corresponding to a membrane surface of about 10 cm²) were prepared as described above.

The module showed an Lp of $10.5 \cdot 10^{-4}$ cm³/(cm²·bar·sec), a sieving coefficient for IgG of 0.99, and a GPR of 2.9 for fraction I. Burst pressure was determined to be 5 bar(g).

Comparative Example 2

Preparation of a Hollow Fiber Membrane

A solution of 13% w/w polyacrylonitrile having a weight average molecular weight of about 200 kDa (HOMO-PAN, Dolan GmbH, D-93309 Kelheim (Donau)) in NMP having a viscosity of 107,300 mPa·s was thermostatted at 25° C. and extruded through the outer ring slit of a spinneret with two concentric openings into a coagulation bath containing water/NMP in a ratio of 40%/60% w/w. A solution containing 25% w/w water and 75% w/w NMP was used as the center fluid and extruded through the inner opening of the spinneret. The temperature of the spinneret was 25° C., the temperature of the coagulation bath was 11° C. and the air gap 1.5 cm. The fibers were spun at a speed of 6 m/min. The fiber obtained had an inner diameter of 340 μm and a wall thickness of 40 μm in a wet state.

The fibers subsequently were washed with demineralized water for 1 h at 70° C. Water was drained from the fibers by centrifugation, and the fibers subsequently were dried overnight at 50° C. under a constant flow of dry air.

Mini-modules comprising 7 fibers (corresponding to a membrane surface of about 10 cm$^2$) were prepared as described above.

The module showed an Lp of $16.0 \cdot 10^{-4}$ cm$^3$/(cm$^2$·bar·sec). The GPR was 3.1 for fraction I. Unfortunately, the fibers were impermeable for IgG (tested using IgG—concentration 1 g/L) and as a result the fibers were blocked after 7 min of filtration.

Comparative Example 3

Preparation of a Hollow Fiber Membrane

A solution of 10% w/w polyacrylonitrile having a weight average molecular weight of about 200 kDa (HOMO-PAN, Dolan GmbH, D-93309 Kelheim (Donau)) and 6% w/w PVP having a weight average molecular weight of about 1,100 kDa (Luvitec® K85, BASF SE) in NMP having a viscosity of 138,100 mPa·s was thermostatted at 31° C. and extruded through the outer ring slit of a spinneret with two concentric openings into a coagulation bath containing water/NMP in a ratio of 30%/70% w/w. A solution containing 25% w/w water and 75% w/w NMP was used as the center fluid and extruded through the inner opening of the spinneret. The temperature of the spinneret was 40° C.; the temperature of the coagulation bath was 21° C. and the air gap 1.5 cm. The fibers were spun at a speed of 6 m/min. The fiber obtained had an inner diameter of 350 μm and a wall thickness of 52 μm in a wet state.

The fibers were subsequently washed with demineralized water for 1 h at 80° C. Water was drained from the fibers by centrifugation, and the fibers were subsequently dried overnight at 50° C. under a constant flow of dry air.

Mini-modules comprising 7 fibers (corresponding to a membrane surface of about 10 cm$^2$) were prepared as described above.

The module showed an Lp of $7.3 \cdot 10^{-4}$ cm$^3$/(cm$^2$·bar·sec). The GPR was 3.1 for fraction I, however a sieving coefficient for IgG (5 g/L) was initially only 0.9 and after 20 min of filtration the fibers were blocked and burst.

Example 4

Preparation of a Hollow Fiber Membrane

A solution of 10% w/w polyacrylonitrile having a weight average molecular weight of about 200 kDa (HOMO-PAN, Dolan GmbH, D-93309 Kelheim (Donau)) and 4.5% w/w PVP having a weight average molecular weight of about 1,100 kDa (Luvitec® K85, BASF SE) in NMP having a viscosity of 84,900 mPa·s was thermostatted at 31° C. and extruded through the outer ring slit of a spinneret with two concentric openings into a coagulation bath containing water/NMP in a ratio of 30%/70% w/w. A solution containing 25% w/w water and 75% w/w NMP was used as the center fluid and extruded through the inner opening of the spinneret. The temperature of the spinneret was 30° C.; the temperature of the coagulation bath was 21° C. and the air gap 1.5 cm. The fibers were spun at a speed of 6 m/min. The fiber obtained had an inner diameter of 345 μm and a wall thickness of 40 μm in a wet state.

Figure 3:
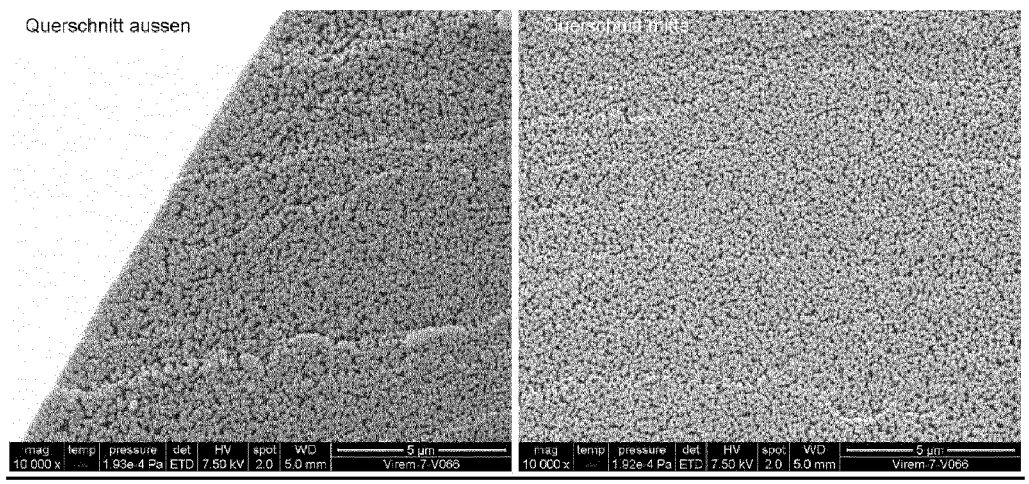
FIG. 3 shows SEM pictures of a cross-section of another embodiment of a membrane near the outer surface and in the center of the membrane wall.

The fibers subsequently were washed with demineralized water for 1 h at 80° C. Water was drained from the fibers by centrifugation, and the fibers subsequently were dried overnight at 50° C. under a constant flow of dry air. SEM pictures of a cross-section of the membrane near the outer surface and in the center of the membrane wall are shown in FIG. 3.

Mini-modules comprising 7 fibers (corresponding to a membrane surface of about 10 cm$^2$) were prepared as described above.

The module showed an Lp of $12 \cdot 10^{-4}$ cm$^3$/(cm$^2$·bar·sec), a sieving coefficient for IgG of 1.0, and a GPR of 2.6 for fraction I. Burst pressure was determined to be 5 bar(g).

Example 5

Preparation of a Hollow Fiber Membrane

A solution of 10% w/w polyacrylonitrile having a weight average molecular weight of about 200 kDa (HOMO-PAN, Dolan GmbH, D-93309 Kelheim (Donau)) and 6% w/w PVP having a weight average molecular weight of about 1,100 kDa (Luvitec® K85, BASF SE) in NMP having a viscosity of 138,000 mPa·s was thermostatted at 31° C. and extruded through the outer ring slit of a spinneret with two concentric openings into a coagulation bath containing water/NMP in a ratio of 30%/70% w/w. A solution containing 25% w/w water and 75% w/w NMP was used as the center fluid and extruded through the inner opening of the spinneret. The temperature of the spinneret was 40° C., temperature of the coagulation bath was 25° C. and the air gap 1.5 cm. The fibers were spun at a speed of 6 m/min. The fiber obtained had an inner diameter of 347 μm and a wall thickness of 41 μm in a wet state.

The fibers subsequently were washed with demineralized water for 1 h at 80° C. Water was drained from the fibers by centrifugation, and the fibers subsequently were dried overnight at 50° C. under a constant flow of dry air.

Mini-modules comprising 7 fibers (corresponding to a membrane surface of about 10 cm$^2$) were prepared as described above.

The module showed an Lp of $11 \cdot 10^{-4}$ cm$^3$/(cm$^2$·bar·sec), a sieving coefficient for IgG of 1.0, and a GPR of 2.8 for fraction I. Burst pressure was determined to be 5 bar(g).

Example 6

Preparation of a Hollow Fiber Membrane

A solution of 10% w/w polyacrylonitrile having a weight average molecular weight of about 200 kDa (HOMO-PAN, Dolan GmbH, D-93309 Kelheim (Donau)) and 4% w/w PVP having a weight average molecular weight of about 1,100 kDa (Luvitec® K85, BASF SE) in NMP having a viscosity of 77,800 mPa·s was thermostatted at 31° C. and extruded through the outer ring slit of a spinneret with two concentric openings into a coagulation bath containing water/NMP in a ratio of 30%/70% w/w. A solution containing 26% w/w water and 74% w/w NMP was used as the center fluid and extruded through the inner opening of the spinneret. The temperature of the spinneret was 30° C., the temperature of the coagulation bath was 21° C. and the air gap 1.5 cm. The fibers were spun at a speed of 6 m/min. The fiber obtained had an inner diameter of 340 μm and a wall thickness of 80 μm in a wet state.

The fibers subsequently were washed with demineralized water for 2 h at 80° C. Water was drained from the fibers by centrifugation, and the fibers subsequently were dried overnight at 50° C. under a constant flow of dry air.

Mini-modules comprising 7 fibers (corresponding to a membrane surface of about 10 cm$^2$) were prepared as described above.

The module showed an Lp of $9 \cdot 10^{-4}$ cm$^3$/(cm$^2 \cdot$bar$\cdot$sec), a sieving coefficient for IgG of 1.0, and a GPR of 3.3 for fraction I. Burst pressure was 10 bar(g).

Example 7

Radiation-Sterilization of Mini-Modules

Mini-modules prepared according to Example 6 were sealed into a laminated polymer-aluminum gas-impermeable packaging containing no oxygen scavenger. The modules were then sterilized with an electron beam at a dose of 25 kGy or 50 kGy, respectively.

After sterilization at 25 kGy, the module showed an Lp of $24 \cdot 10^{-4}$ cm$^3$/(cm$^2 \cdot$bar$\cdot$sec), a sieving coefficient for IgG of 1.0, and a GPR of 3.3 for fraction I.

After sterilization at 50 kGy, the module showed an Lp of $40 \cdot 10^{-4}$ cm$^3$/(cm$^2 \cdot$bar$\cdot$sec), a sieving coefficient for IgG of 1.0, and a GPR of 2.8 for fraction I.

The invention claimed is:

1. A porous hollow fiber membrane having a homogeneous sponge-like structure free of macrovoids having a largest dimension of more than 5 μm, the membrane comprising:
  75-85 wt % of polyacrylonitrile and 15-25 wt % of polyvinylpyrrolidone, relative to the total weight of the membrane, wherein the polyvinylpyrrolidone has a weight average molecular weight in the range of from 1,000 to 2,000 kDa, wherein the membrane is prepared from a polymer solution comprising, relative to the total weight of the polymer solution, from 8 to 12 wt % of polyacrylonitrile and from 2 to less than 6 wt % of polyvinylpyrrolidone, and the membrane has a sieving coefficient for IgG, determined by dead-end filtration of a solution of 15.0 g/l IgG in PBS buffer at 25° C., of greater than 0.9, and a Gold Particle Retention (GPR) value for 20 nm gold particles, measured at 25° C., of greater than 1.7.

2. The membrane of claim 1, having a hydraulic permeability, measured at 37° C., of from $8 \cdot 10^{-4}$ to $15 \cdot 10^4$ cm$^3$/(cm$^2 \cdot$bar$\cdot$sec).

3. The membrane of claim 1, having a hydraulic permeability, measured at 37° C., of from $20 \cdot 10^{-4}$ to $40 \cdot 10^{-4}$ cm$^3$/(cm$^2 \cdot$bar$\cdot$sec).

4. The membrane of claim 1, having an inner diameter of from 300 to 400 μm; a wall thickness from 40 to 85 μm; and a burst pressure of at least 5 bar(g).

5. A continuous solvent phase inversion spinning process for preparing a porous hollow fiber membrane, the process comprising:
  dissolving at least one polyacrylonitrile and at least one polyvinylpyrrolidone in N-methyl-2-pyrrolidone to form a polymer solution;
  extruding the polymer solution through an outer ring slit of a nozzle with two concentric openings into a precipitation bath;
  simultaneously extruding a center fluid through the inner opening of the nozzle;
  washing the membrane obtained; and
  subsequently drying the membrane;
  wherein the polymer solution comprises, relative to the total weight of the polymer solution, from 8 to 12 wt % of polyacrylonitrile and from 2 to less than 6 wt % of polyvinylpyrrolidone having a weight average molecular weight in the range of from 1,000 to 2,000 kDa.

6. The process of claim 5, wherein the polymer solution has a viscosity, measured according to DIN EN ISO 1628-1 at 22° C., in the range of from 50,000 to 140,000 mPa$\cdot$s.

7. The process of claim 5, wherein the center fluid comprises 20 to 40 wt % of water and 60 to 80 wt % of NMP, relative to the total weight of the center fluid.

8. The process of claim 5, wherein the precipitation bath comprises 20 to 40 wt % of water and 60 to 80 wt % of NMP, relative to the total weight of the precipitation bath.

9. The process of claim 5, wherein the temperature of the spinneret is in the range of from 25 to 50° C.

10. The process of claim 5, wherein the membrane is spun at a speed of from 5 to 10 m/min.

11. The process of claim 5, wherein the membrane is sterilized with beta radiation or electron beam at from 25 to 50 kGy subsequently to drying.

12. A diffusion and/or filtration device comprising a membrane according to claim 1, or a membrane prepared according to claim 5.

13. A method of using a membrane according to claim 1, or a membrane prepared according to claim 5, the method comprising:
  filtration of a liquid through the membrane for removing virus particles from the liquid.

14. The method of claim 13, wherein the filtration is tangential-flow filtration.

15. A diffusion and/or filtration device comprising a plurality of membranes according to claim 1.

16. A diffusion and/or filtration device comprising a plurality of membranes prepared according to claim 5.

* * * * *

UNITED STATES PATENT AND TRADEMARK OFFICE
CERTIFICATE OF CORRECTION

PATENT NO. : 10,005,044 B2  
APPLICATION NO. : 14/766844  
DATED : June 26, 2018  
INVENTOR(S) : Hornung et al.

Page 1 of 1

It is certified that error appears in the above-identified patent and that said Letters Patent is hereby corrected as shown below:

In the Claims

Column 11, Line 55, replace the portion of equation "$15 \cdot 10^4$" with "$15 \cdot 10^{-4}$"

Signed and Sealed this  
Twenty-eighth Day of August, 2018

Andrei Iancu  
*Director of the United States Patent and Trademark Office*